(12) United States Patent
Kumar et al.

(10) Patent No.: US 11,403,690 B2
(45) Date of Patent: Aug. 2, 2022

(54) DETERMINING BRAND AFFINITY OF USERS

(71) Applicant: Walmart Apollo, LLC, Bentonville, AR (US)

(72) Inventors: Sushant Kumar, Sunnyvale, CA (US); Hyun Duk Cho, San Francisco, CA (US); Kannan Achan, Saratoga, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 503 days.

(21) Appl. No.: 16/260,485

(22) Filed: Jan. 29, 2019

(65) Prior Publication Data

US 2019/0236679 A1 Aug. 1, 2019

Related U.S. Application Data

(60) Provisional application No. 62/623,477, filed on Jan. 29, 2018.

(51) Int. Cl.
*G06Q 30/06* (2012.01)
*G06Q 30/02* (2012.01)
*G06N 7/00* (2006.01)
*G06N 3/02* (2006.01)

(52) U.S. Cl.
CPC .......... *G06Q 30/0631* (2013.01); *G06N 3/02* (2013.01); *G06N 7/005* (2013.01); *G06Q 30/0255* (2013.01); *G06Q 30/0277* (2013.01)

(58) Field of Classification Search
None
See application file for complete search history.

(56) References Cited

U.S. PATENT DOCUMENTS

| 6,981,040 B1 * | 12/2005 | Konig ................ G06N 20/00 |
| 9,443,209 B2 | 9/2016 | Parikh et al. |
| 10,325,279 B2 | 6/2019 | Banks |

(Continued)

OTHER PUBLICATIONS

@Misc{michalis2011recommendation, title={Recommendation systems: a joint analysis of technical aspects with marketing implications}, author={Vafopoulos Michalis and Oikonomou Michael}, year={2011}, eprint={1112.2251}, archivePrefix={arXiv}, primaryClass={cs.IR}}. (Year: 2011).*

*Primary Examiner* — Michelle T Kringen
(74) *Attorney, Agent, or Firm* — Bryan Cave Leighton Paisner LLP

(57) ABSTRACT

A method including a user who has brand affinities about a product brand or a product brand category. The method can include analyzing whether the user has brand affinities for the product brand or the brand category with two binary classification models that can include (a) a model one to determine an affinity to a particular product brand and (b) a model two to determine an affinity to a particular product brand category. The method also can include analyzing whether the user has affinities for a similar product brand or a similar product brand category by a model three neural network. The method can include displaying recommendations and the promotions for a product brand, a product brand category, a similar product brand, or a similar product brand category to the user. Other embodiments are disclosed.

20 Claims, 6 Drawing Sheets

(56) References Cited

U.S. PATENT DOCUMENTS

| | | | |
|---|---|---|---|
| 10,423,999 B1* | 9/2019 | Doctor | G06Q 30/0625 |
| 2015/0193685 A1* | 7/2015 | Srinivasan | H04N 21/25 706/11 |
| 2018/0268025 A1* | 9/2018 | Bandyopadhyay | G06N 20/00 |
| 2019/0095495 A1* | 3/2019 | Venkata Naga Ravi | G06F 16/24568 |
| 2019/0138616 A1* | 5/2019 | Parameshwara | G06F 16/3347 |
| 2019/0205965 A1* | 7/2019 | Li | G06F 16/9535 |

* cited by examiner

600

| 610 - | User engages in multiple activities on-line. |

| 620 - | Personalization captures relevant user activities and features related to Brands and categories. |

| 630 - | Brand Affinity Model: Measure affinity of a user to a given brand. |

| 640 - | Brand Category Affinity Model: Measure affinity of a user to a given brand for a given category. |

| 650 - | Brand Similarity Model: Measure similarity between two brands. |

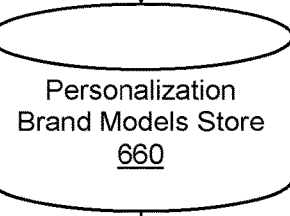

Personalization Brand Models Store
660

| 670 - | Personalization uses the Brand-related models to recommend relevant content on site/app/email/push notifications. |

FIG. 6

DETERMINING BRAND AFFINITY OF USERS

CROSS-REFERENCE TO RELATED APPLICATIONS

This application claims the benefit of U.S. Provisional Application No. 62/623,477, filed on Jan. 29, 2018. U.S. Provisional Application No. 62/623,477 is incorporated herein by reference in its entirety.

TECHNICAL FIELD

This disclosure relates generally to human preferences when purchasing products through on-line websites based on certain affinity for products or certain affinity for preferred product brands of similar products.

BACKGROUND

Websites display content for users that is regularly changing. Many users select content on websites based on either affinity for products and/or affinity for products based on brands.

BRIEF DESCRIPTION OF THE DRAWINGS

To facilitate further description of the embodiments, the following drawings are provided in which:

FIG. 6 illustrates a flow chart for a method, according to another embodiment.

Figure 1:
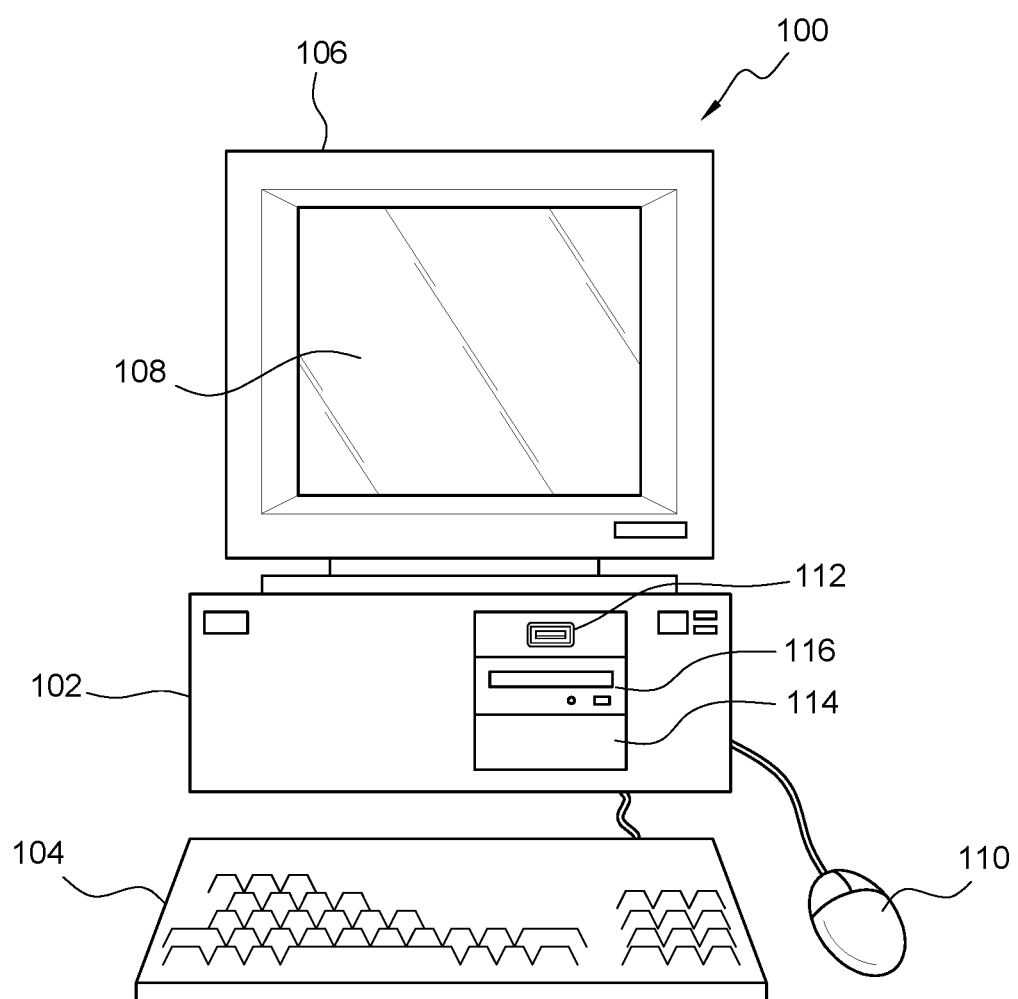
FIG. 1 illustrates a front elevational view of a computer system that is suitable for implementing an embodiment of the system and methods disclosed in FIGS. 3-6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Determining Brand Affinity

DETAILED DESCRIPTION

Figure 2:
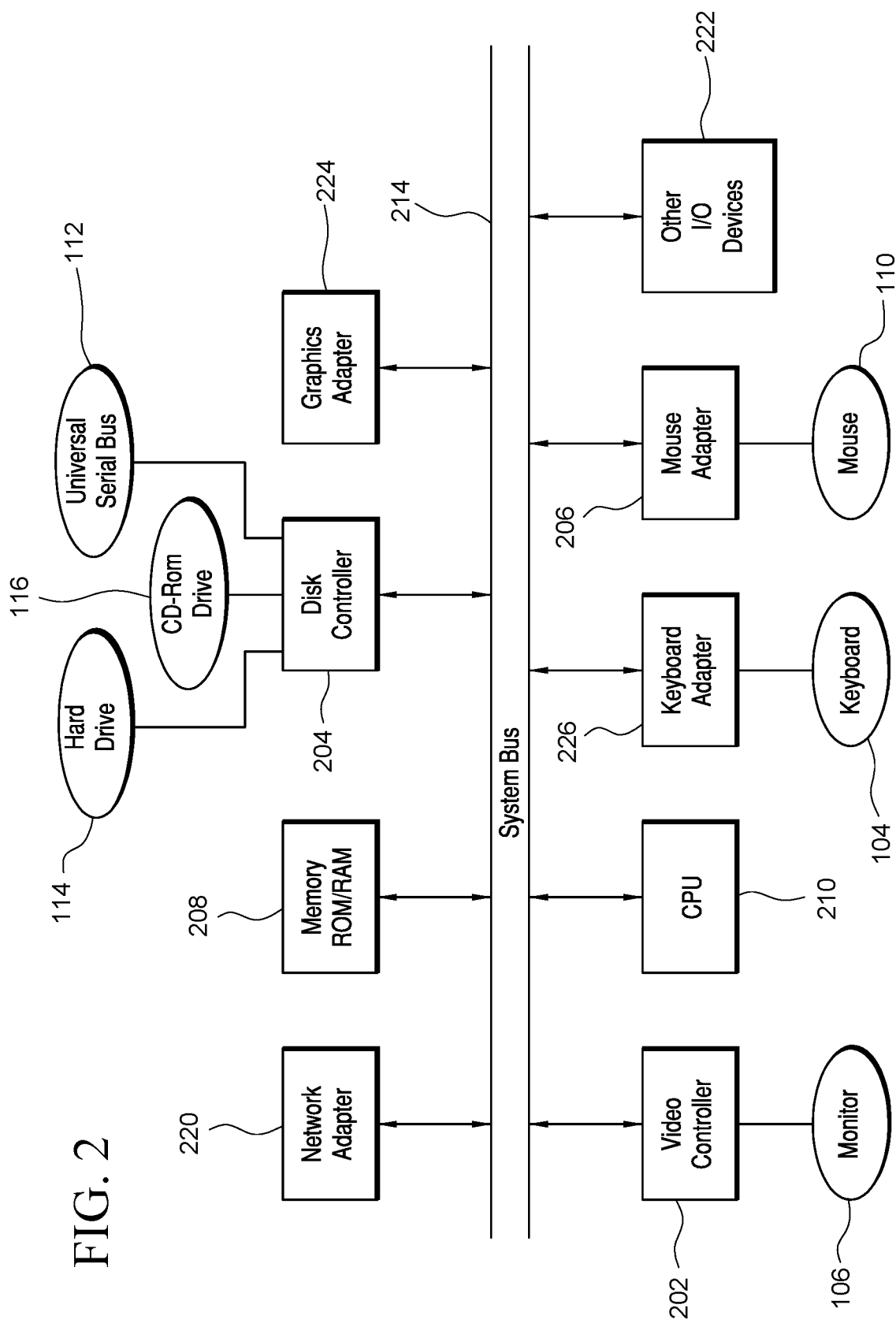
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein and/or operating part or all of one more embodiments of the memory storage modules described herein. As an example, a different or separate one of a computer system 100, all of which or a portion of which can be suitable for (i) implementing part or all of one or more embodiments of the techniques, methods, and systems and/or (ii) implementing and/or operating part or all of one or more embodiments non-transitory computer readable media described herein. As an example, a different or separate one of computer system 100 (and its internal components, or one or more elements of computer system 100) can be suitable for implementing part or all of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

When computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
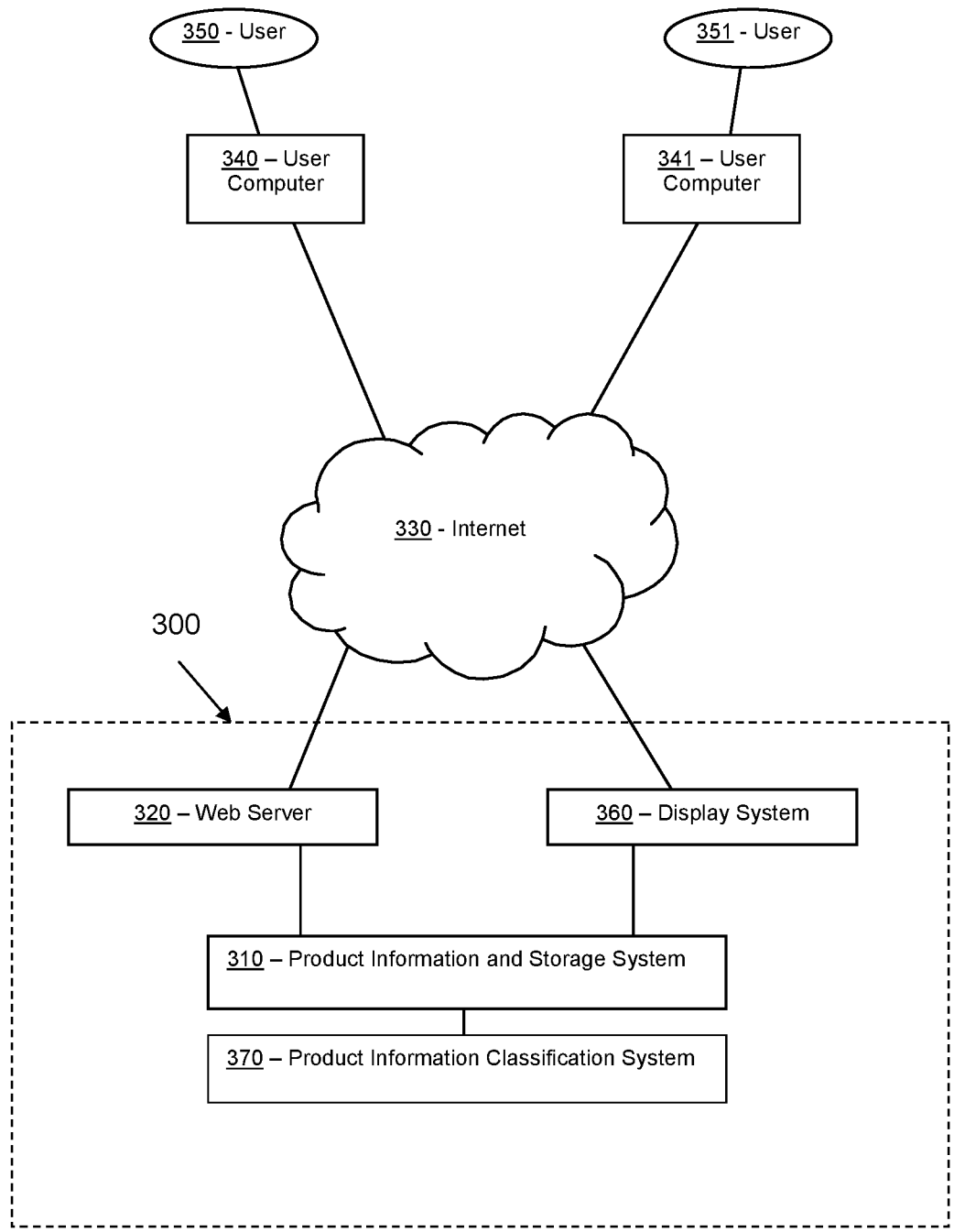
FIG. 3 illustrates a block diagram of a system that can be employed for determining user brand affinities for a product or product brand.

Turning ahead in the drawings, FIG. 3 illustrates a block diagram of a system 300 that can be employed for identifying whether user (e.g., a person) can have an affinity, when searching or purchasing, for certain brands or brand categories, according to an embodiment, as described in greater detail below. Additionally, system 300 can be employed to determine whether a user has an affinity for similar brands and similar brand categories, described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In general, retailers can continually increase, at an exponential rate, the number of catalog of items for sale that can be available to buyers at any given time. Retailers often can tend to expand vertically in different product categories, such as, apparel, shoes, and outdoor equipment etc., which can present a problem to resolve for certain groups of buyers with affinities for brands or brand categories. An advantage for retailers tracking the sales and web views of one or more products for one or more brands can be to identify whether a buyer or shopper has an affinity for certain brands for all categories of products sold under that brand where this type of affinity for a brand or brands can be referred to as brand affinity. In some embodiments, a product sold under a brand can be referred to interchangeably as a brand product or a product brand. Another advantage for retailers tracking sales and web views can be to determine whether the affinity for a certain brand can be particular to a certain product or product category, not just an affinity for the brand, wherein this type of affinity can be referred to as a brand affinity given a product category. Further, retailers of products with brands can determine when users (e.g., shoppers, buyers) can have an affinity for one or more brands that are co-viewed on a website or co-purchased on a website where this type of affinity can be referred to as similar brand affinity or similar brand category affinity. In other words, a shopper can have an affinity for a product sold under one brand and an affinity for a related or similar product sold under another brand.

In some embodiments, identifying whether brand affinity can be exhibited as part of the purchase decisions made by users (e.g., shoppers, buyers) can result in creating helpful methods and systems a retailer (e.g., virtual retailer). In several embodiments, such helpful methods and systems can be personalization or searching for specific brands for users that can provide a meaningful experience to them by using direct communication channels geared toward a specific group of users (e.g., shoppers, buyers) that can have an affinity for brands using various channels of communication from retailers and online retailers (e.g., virtual retailers) including communicating via a software application ("app"), via emails, via push notifications, etc. In a number of embodiments, users (e.g., shoppers, buyers) can welcome receiving desired messages (e.g., customized messages) and product information before a new brand of products can be available for purchase through normal channels of communication used in sales and marketing. In various embodiments, product information before a new brand of products can be available for purchase can include product information for merchandise, such as, a new version of a favorite game for children, a new model of a particular brand of cell phone and/or computing device, and/or trending products for certain popular brands advertised through social media. In some embodiments, methods and systems can identify certain users (e.g., shoppers, buyers) with known affinities for certain brands that can result in early notification to an interested set of users (e.g., shoppers, buyers) of the brands or brand categories, as described below in greater detail. In several embodiments, identifying certain users with known affinities can include certain factors and/or parameters, such as, when and where the new product merchandise can be available, as well as, providing a select group of interested users (e.g., buyers, shoppers) with price discounts and/or other incentives to purchase products produced by brands and brand categories of special interest to them. In several embodiments, users (e.g., buyers, shoppers) can benefit from receiving relevant information about brands and brand categories for products (e.g., items) that they can be looking (e.g., searching) to purchase. Such notifications can be sent from retailers and/or vendors, for example, by sending a mobile push notification to user devices (e.g., user computers, mobile devices) when the retailer and/or vendor can have made a logical connection between the user and the brand affinity of the user for products (e.g., purchases, services). Another advantage of knowing (e.g., understanding) the brand affinities of users can be for the benefit of the vendor of the brands with affinities (e.g., users that can have an affinity for a brand) by providing opportunities to build, strengthen, and enhance brand perception among a distinct population that can be determined to have brand affinities for the merchandise (e.g., products and/or services) sold by the vendor.

In some embodiment, retailers can desire to use more efficient and accurate methods and/or systems that can provide relevant products for a group of users (e.g., shoppers, buyers) that purchase products online (e.g., browsing the webpages of the website of a retailer) and/or at a physical store (e.g., brick and mortar) location of the retailer. In many embodiments, retailers can be interested in determining a segment and/or population of users (e.g., shoppers, buyers) that can frequently purchase more products that belong to the same brand and/or brand category, than other products purchased, in order to provide relevant promotions, notifications, discounts, and/or other recommendations. In various embodiments, identifying such segments of users (e.g., shoppers, buyers) can provide challenges in the identification of the segment of users as users (e.g., shoppers, buyers) often can purchase a variety of products from a variety of brands and/or different brand categories. Additionally, users (e.g., shoppers, buyers) often browse webpages for a variety of products from a variety of brands and brand categories during a single session, therefore identification of such a segment of users can be far from a straightforward approach to accumulate and/or analyze data.

In many embodiments, a method and/or a system can be based on monitoring certain user features or activities associated with shopping for products that can efficiently and accurately determine (or predict probabilities to define) such a segment or population of users (e.g., shoppers, buyers) that can be determined to likely have affinities for certain brands for a variety of products and/or affinities for other products and/or other brand categories. In another embodiment, the features or activities of users (e.g., shoppers, buyers), in the aggregate, can be tracked regularly and evaluated using at least the methods of binary classifications, logistic regression models, and/or neural networks. In many embodiments, determining categories of derived affinities for certain brands and/or brand categories of products can be based on the tracked features and/or activities.

In many embodiments, identifying a segment or population of users (e.g., shoppers, buyers) that can be determined to have affinities for certain brands can begin with analyzing various sources of data based on previous purchasing histories, browsing and/or searching histories, queries for certain products, and other sources of data. The terms product and item are exemplary and used interchangeably to refer to any product or any item for sale. The terms product or item, in the singular or plural, are merely exemplary and embodiments for determining a product or item can be employed in many different embodiments or by many different examples.

In some embodiments, by tracking features or activities of users (e.g., shoppers, buyers), retailers can determine a group of users (e.g., shoppers, buyers) that can have affinities for purchasing certain products or product categories by brands. In various embodiments, based on tracking shopper activities in the aggregate, retailers can determine a group of users (e.g., shoppers, buyers) that have affinities for purchasing certain products or product categories from one or more brands. A shopper can have more than one affinity for more than one brand or brand category per product.

In several embodiments, various methods and/or systems can be used by a retailer that can determine whether a user frequently purchases, browses a webpage for certain products, and/or prefers to purchase certain products. In some embodiments, a retail also can use methods and/or systems of tracking at least one or more user activities, user behaviors, user preferences, and user purchases associated with a product, an item, a product category, an item category, and/or other consumer purchases that also can determine user brand preferences and/or whether the user does not have a brand preference for certain products based on user behavior.

In many embodiments, users (e.g., shoppers, buyers) that frequently purchase a brand product (including a service) online (e.g., while browsing a webpage or website) and/or in a physical store (e.g., brick and mortar) can be determined to likely have an affinity for the brand product, and more specifically, users (e.g., shoppers, buyers) that frequently purchase a brand product online and/or in a physical store (e.g., brick and mortar) exceeding a pre-determined number of times within a pre-determined period of time can be determined to likely have an affinity for certain brand products of that brand. In some embodiments, users (e.g., shoppers, buyers) that frequently purchase a product in a category of that brand online or in a physical store (e.g., brick and mortar) exceeding a pre-determined number of times within a pre-determined period of time can be determined to likely have an affinity for that product in a brand category. In another embodiment, when a shopper purchases a lot of items that belong to the same brand it also can be determined that the shopper is more loyal to that brand than other brands for the same line of product categories. In several embodiments, similar conclusions that the shopper is more loyal to that brand than other brands for the same line of product categories additionally can be derived based on the following approaches that can include exceeding a threshold of a pre-determined number of times a user added items to a shopping cart (e.g., online and/or at a physical store). In some embodiments, conclusions that the shopper is more loyal to that brand than other brands for the same line of product categories also can include exceeding a threshold of times (e.g., incidents) that a user browsed items on a website and/or exceeding a certain pre-determined frequency of times the browsing activities resulted in cart-adds. In many embodiments, additional conclusions that the user (e.g., shopper, buyer) is more loyal to that brand than other brands for the same line of product categories can include monitoring a number of products of a particular brand in shopping carts that exceeds a threshold of a pre-determined number of such products within a pre-determined period of time and/or browsing a web site a number of times for a particular brand that exceeds a pre-determined threshold number within a pre-determined period of time.

In various embodiments, some users (e.g., shoppers, buyers) that do not frequently purchase a brand product (including a service) online (e.g., while browsing a webpage or website) and/or in a physical store (e.g., brick and mortar) can be determined to not likely have brand affinity for a product or product category, and more specifically, users (e.g., shoppers, buyers) that purchase a brand product online or in a physical store (e.g., brick and mortar) below a pre-determined number of times within a pre-determined period of time can be determined to not likely have an affinity for the product or brand purchased. In many embodiments, likewise, several users (e.g., shoppers, buyers) that purchase a brand product online or in a physical store (e.g., brick and mortar) below a pre-determined number of times within a pre-determined period of time can be determined to likely not have brand loyalty or brand affinity for a product or brand of that product or product category.

In many embodiments, retailers can determine when a user has brand affinity for a brand or product within the brand by using logistical regression models to calculate an interest or affinity a user has for a certain product. The logistical regression models and binary classification equations can be based on at least one feature, or user activity, among many features and activities comprising items purchased, items searched for, items clicked, items co-bought, webpages visited, geographic location, income level, category information, product descriptions, product reviews, user profiles, and/or external websites, as discussed in greater detail below. In several embodiments, features or activities of users (e.g., shoppers, buyers) can be used as data input for all of the equations for a model one binary classification, a model two binary classification, and/or also a model three neural network, as discussed in greater detail below. In some embodiments, the model three neural network output also can be used as data for input into the model one binary classification model and/or the model two binary classification model as the end output of these models can result in determining that an affinity exists for one or more similar brands, wherein a shopper that purchases one similar brand can be likely to purchase another similar brand. All of the three models are independent of each other, (e.g., model one, model two, and model three) as the results of the regression models and/or neural networks can result in separate information that can be analyzed by the retailer and also can be employed in many different embodiments and/or by many different examples.

In many embodiments, an affinity for a brand or a product within the brand can be a name brand product where the price of the name brand product is discounted for sale. Another embodiment of an affinity for a brand or a product within the brand can be a non-brand (including generic brand, and/or store brand) product when the price of the non-brand product is below the price of a name brand product with similar product descriptions and product attributes. Such a non-brand product can be a generic version of a brand product independent of any price difference between the generic version of the brand product and the corresponding brand product.

In some embodiments, system 300 can include a product information and storage system 310, a web server 320, a display system 360, and/or a product information classification system 370. In several embodiments, product information and storage system 310, web server 320, display system 360, and/or product information classification system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of product information and storage systems 310, web server 320, display system 360, and/or product information system 370. Additional details regarding product information and storage system 310, web server 320, display system 360, and/or product information classification system 370 are described herein.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host a website that allows users to browse and/or search for products, to add products to an electronic shopping cart, and/or to purchase products, in addition to other suitable activities.

In many embodiments, product information and storage system 310, web server 320, display system 360, and/or product information classification system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of product information and storage system 310, web server 320, display system 360, and/or product information classification system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of product information and storage system 310, web server 320, display system 360, and/or product information classification system 370. In a similar manner, the processing module(s) and the memory storage module(s) can be local and/or remote to each other.

In many embodiments, product information and storage system 310, web server 320, display system 360, and/or product information classification system 370 can be configured to communicate with one or more user computers 340 and 341. In some embodiments, user computers 340 and 341 also can be referred to as user computers. In some embodiments, product information and storage system 310, web server 320, display system 360, and/or product information classification system 370 can communicate or interface (e.g., interact) with one or more user computers (such as user computers 340 and 341) through a network or internet 330. Internet 330 can be an intranet that is not open to the public. Accordingly, in many embodiments, product information and storage system 310, web server 320, display system 360, and/or product information classification system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as shoppers or buyers, in which case, user computers 340 and 341 can be referred to as shopper or buyer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, product information and storage system 310, web server 320, display system 360, and/or product information classification system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between product information and storage system 310, web server 320, display system 360, product information classification system 370 and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, an internal network that is not open to the public can be used for communications between product information and storage system 310, web server 320, display system 360, product information classification system 370. In some embodiments, the same or another internal network can be used for communications between product information and storage system 310, web server 320, display system 360, product information classification system 370. Accordingly, in some embodiments, product information and storage system 310, web server 320, display system 360, product information classification system 370 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

Figure 4:
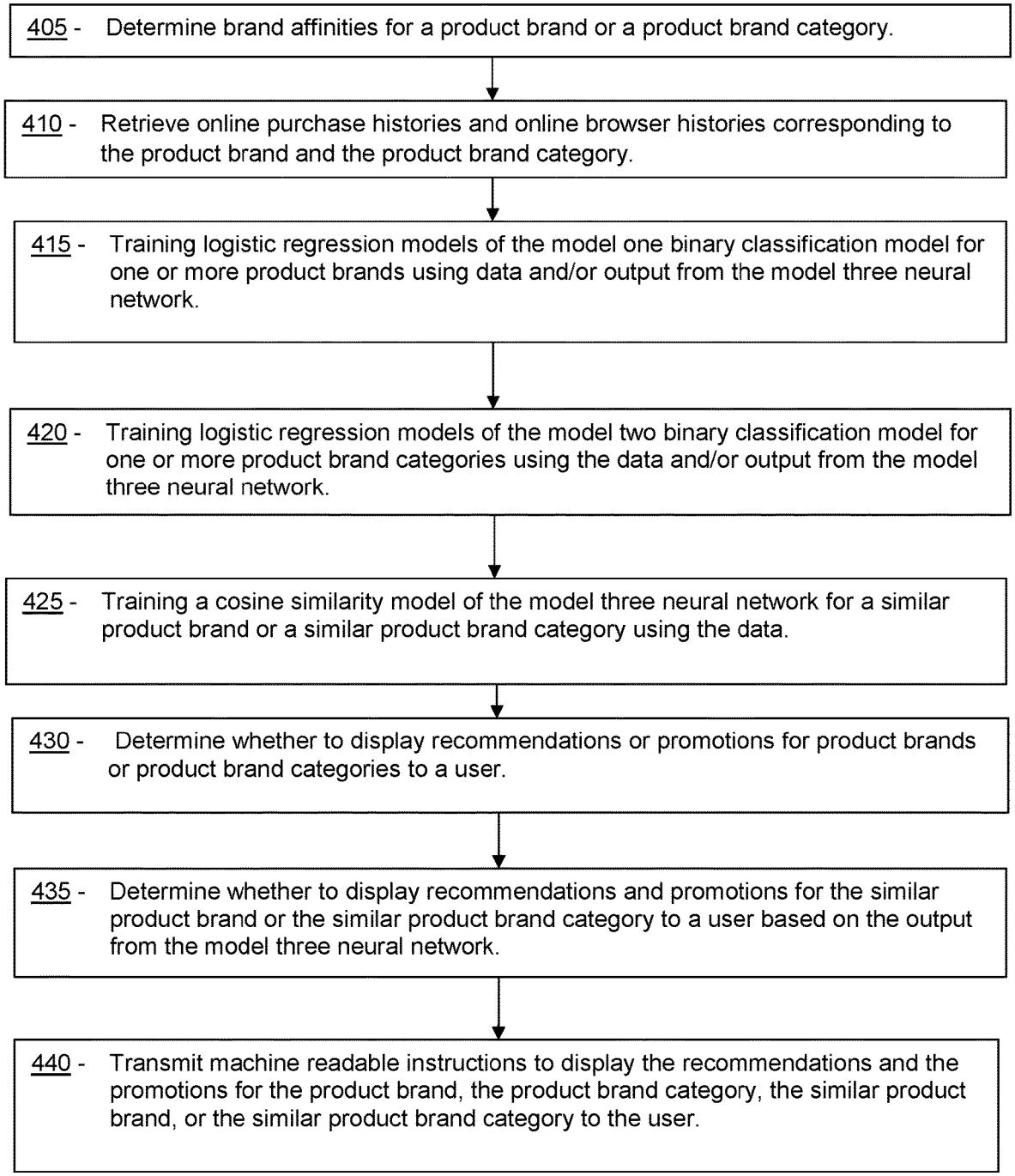
FIG. 4 illustrates a flow chart for a method, according to another embodiment.
Figure 5:
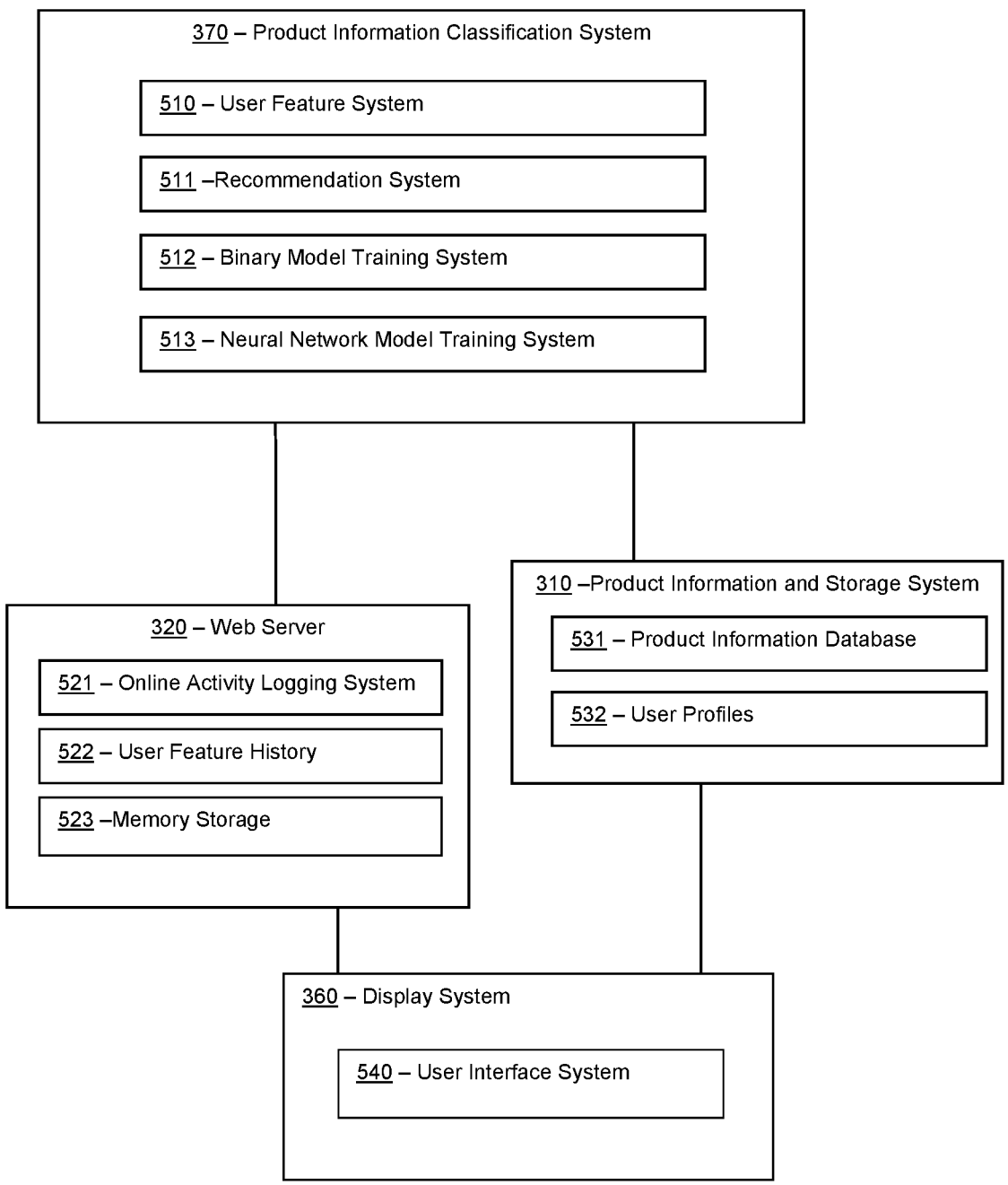
FIG. 5 illustrates a representative block diagram for determining user brand affinities for a product or product brand, according to the embodiment of FIG. 4.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 523 (FIG. 5). Such non-transitory memory storage modules can be part of a computer system such as product information and storage system 310 (FIG. 3) and/or web server 320 (FIGS. 3 & 5) and/or display system 360 (FIGS. 3 & 5). The non-transitory memory storage modules and the processing module(s) can be similar or identical to the processing module(s) and non-transitory memory storage modules described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include block 405 for determining brand affinities for a product brand or a product brand category, block 410 for retrieving first data from online purchase histories and online browser histories corresponding to the product brand and the product brand category, block 415 for training logistic regression models of the model one binary classification model to derive or determine affinities for one or more product brands using first data and/or output from the model three neural network, block 420 for training logistic regression models of the model two binary classification model to derive or determine affinities for one or more product brand categories using the first data and/or output from the model three neural network, block 425 for training a cosine similarity model of the model three neural network to derive or determine affinities for a similar product brand or a similar product brand category using the first data, block 430 for determining whether to display recommendations or promotions for product brands or the first product brand categories to a first user, block 435 for determining whether to display recommendations and promotions for the similar product brand or the similar product brand category to a first user based on the output from the model three neural network, and block 440 for transmitting machine readable instructions to display the recommendations and the promotions for the first product brand, the first product brand category, the similar product brand, or the similar product brand category to the first user.

More specifically, in many embodiments, method 400 can include block 405 for determining brand affinities for a product brand or a product brand category. In a number of embodiments, websites and retailers can attract different types of users (e.g., shoppers, buyers). Some of the most prominent users (e.g., shoppers, buyers) can be those who can be interested in brands or products within brands. In some embodiments, users (e.g., shoppers, buyers) that can show affinities for brands or brand categories also can desire a particular brand product minus a price discount. In some embodiments, websites can tailor marketing and/or recommendations for products that some users (e.g., shoppers, buyers) can find helpful to save money leading to a better quality of life. However, identifying some of these segments or populations of users (e.g., shoppers, buyers) can be less than straightforward. In some embodiments, a method or system can utilize personal information and/or features that can help identify these users (e.g., shoppers, buyers).

In several embodiments, method 400 can include block 415 for training a logistic regression model of a model one binary classification model to create a trained model using at least the first data to provide a probability that a shopper or buyer can be determined to likely have brand affinity for products sold under that brand.

In many embodiments, the features in the user feature system 510 (FIG. 5) can be features (e.g. predictor variables) used in the regression. The objective function for the logistic regression model can be the dependent variable of whether or not the shopper or buyer purchased the brand product, browsed the webpage or website for the brand product, browsed featured brand category pages, brand-related facets on search pages (e.g. search results from selected list of brands), search queries related to brands, adding an item to a shopping cart (e.g., online website and/or a physical store), or other shopping related activities for the brand products or products within a brand category. The training data used to train the logistic regression can include the portions of user feature system 510 (FIG. 5) wherein the output of the logistic regression model can be a probability score. When the level of probability exceeds a pre-determined threshold for a pre-determined period of time, it is determined that the user (e.g., shopper, buyer) likely has an affinity for a certain brand and/or brands, wherein block 435 recommends displaying and/or transmitting at least early notifications of products sold by the brand and/or brands, price discounts for products sold within the brands, reminders, and/or other sales communications for the brand. When the level of probability is below a pre-determined threshold for a pre-determined period of time, it is determined that the user likely does not possess an affinity for a brand and/or brands of a product, wherein block 435 recommends other items or price discounts for the other items that correspond to the profile data in the user profiles stored in product information and storage system 310 (FIG. 3) (which can be a database of the retailer) in user profiles 532 (FIG. 5).

In several embodiments, training the logistic regression model of the model one binary classification model in block 415 can create a trained model using at least the first data to provide a probability that a user (e.g., shopper or buyer) can be determined to likely have brand affinity for products sold under that brand. The model one binary classification model can be used to determine brand affinity represented as binary using the first data including user features or activities, wherein the model one to determine the affinity to the particular first product brand further comprises the first user represented as:

$$\text{Affinity for Brand } M = \\ P(\text{Brand} = M \mid \text{User Features for Brand} = M) = \\ P(B = M \mid F_{M1}, F_{M2} F_{M3}, \ldots) \quad (1)$$

wherein, P is for probability, B is a brand, M is a particular brand, F is a feature of the first user and $F_{M1}$, $F_{M2}$, $F_{M3}$, . . . are features related to a user for whom the brand affinity is being computed.

In several embodiments, method 400 can include block 420 for training a logistic regression model of a model two binary classification model to create a trained model using at least the first data to provide a probability that a shopper or buyer can be determined to likely have brand affinity for product categories sold under that brand rather than brand affinity for the brand.

In many embodiments, the features in the user feature system 510 (FIG. 5) can be features (e.g. predictor variables) used in the regression. The objective function for the logistic regression model can be the dependent variable of whether or not the shopper or buyer purchased the brand product, browsed the webpage or web site for the brand product, browsed featured brand category pages, brand-related facets on search pages (e.g. search results from selected list of brands), search queries related to brands, adding an item to a shopping cart (e.g., online or in a physical store), or other shopping related activities for the brand products or products within a brand category. The training data used to train the logistic regression can include the portions of user feature system 510 (FIG. 5) wherein the output of the logistic regression model can be a probability score. When the level of probability exceeds a pre-determined threshold for a pre-determined period of time, it is determined that the user (e.g., shopper or buyer) likely has an affinity for a certain brand category or brand category, wherein block 435 recommends at least early notifications of products in certain product categories sold by the brand or brands, price discounts for products in certain product categories sold within the brands, reminders, and/or other sales communications for the brand categories. When the level of probability is below a pre-determined threshold for a pre-determined period of time, it is determined that the user is likely does not possess an affinity for a brand category or brands of a product category, wherein block 435 recommends other items or price discounts for the other items that correspond to the profile data in the user profiles stored in product information and storage system 310 (FIG. 3) (which can be a database of the retailer) in user profiles 532 (FIG. 5).

In several embodiments, training the logistic regression model of the model two binary classification model in block 420 can create a trained model using at least the first data to provide a probability that a user (e.g., shopper or buyer) can be determined to likely have affinity for products within a product category sold under that brand referred to as affinities for brand categories rather than just an affinity for a brand. The model two binary classification model used to determine the affinity to the particular first product brand category can comprises a binary classification model similar to the model one except that positive labels for the binary classification model uses only affinity to a brand for a given brand category while treating other brands as negative labels, wherein the first user can be represented as:

$$\text{Affinity for Brand } M(\text{Category } A) = P(\text{Brand}=M, \\ \text{Category}=A \mid \text{User Features for Brand}=M) = P \\ (B=M, \text{Category}=A \mid F_{M1}, F_{M2} F_{M3}, \ldots) \quad (2)$$

wherein A is a brand category comprising a category or a SKU; B is a brand, M is a particular brand, F is a feature of the first user and $F_{M1}$, $F_{M2}$, $F_{M3}$, . . . are features related to a user for whom the brand affinity is being computed.

In method 400, blocks 415 and 420 are merely exemplary and are not limited to the embodiments presented herein. Blocks 415 and 420 can be employed in many different embodiments or examples not specifically depicted or described herein. In some embodiments, the procedures, the processes, and/or the activities of blocks 415 and 420 can be performed in the order presented. In other embodiments, the procedures, the processes, and/or the activities of blocks 415 and 420 can be performed in any suitable order. In still other embodiments, one or more of the procedures, the processes, and/or the activities of blocks 415 and 420 can be combined or skipped.

Referring to FIG. 4, the model one can help to determine a general brand affinity of a user (e.g., shopper or buyer) whereas model two can help to determine the brand preferences at a category level of the user (e.g., shopper or buyer). In some embodiments, this difference between model one and model two can be better understood by discussing an example. For example, a user (e.g., shopper or buyer) prefers Samsung products in general (from model one), but when it comes to tablets, the shopper or buyer prefers Microsoft tablets over Samsung or Apple tablets (from model two). In method 400, both model one and model two can be treated as binary classification models. In model one, when given a vector of user (e.g., shopper or buyer) features, a classification can be derived as to whether a user is likely to have an affinity to a given brand. Similarly, for model two, given a vector of user (e.g., shopper or buyer) features, the user can be classified as having an affinity to a given brand in a given product category. In some embodiments, blocks 415 and 420 train multiple regression models to derive affinities for various models as a binary classification problem. In several embodiments, in order to scale to a multi-label classification, method 400 trains a deep neural network with user features for input and affinity labels for model one and model two separately to get the feature weight vectors for respective models. In many embodiments, the neural network model can be used to identify the top K brands for which users (e.g., shoppers, buyers) can exhibit strong affinity for one brand from among all possible brands, where K can be controlled through thresholds determined by the business and product requirements for user applications. In several embodiments, block 425 can use a cosine similarity model that can derive the model 3 to identify similar brands and/or similar brand categories using first data related to online features and activities that can train a neural network with product attributes and other relevant features such as co-bought, co-clicked, co-viewed brands to obtain latent vector representation of brands.

In several embodiments, method 400 can include block 425 for training a cosine similarity model of a model three neural network to create a trained model using the first data related to online features and activities to provide a probability that a user (e.g., shopper or buyer) can be determined to have affinities for a similar product brand or a similar product brand category. In another embodiment, a user can have affinities for more than one brand or brand categories. In some embodiments, a user (e.g., shopper or buyer) can engage in online activities that consist of one or more different sessions wherein a session can be defined as a duration of a visit to a website by a user. In some embodiments, a single user may have multiple sessions associated with that user as tracked in the first data where sentences can be input to word embedding algorithms and where each sentence can comprise words. In some embodiments, word embedding algorithms can allow extraction of latent space of the words. In some embodiments, these sessions can form sentences in a neural network model where, in generating model three, each session can be treated as a sentence.

In several embodiments, block 425 can use each session (where products can be purchased or viewed online by users) as input data for the neural network. In some embodiments, product brands are extracted and can then be treated as words in a sentence, and these sentences can be used to generate word embedding. In method 400, word embedding allows the system to infer latent features that were not previously present so that the system and/or method can find product similarities between one or more bands that can provide deeper analysis using the model three neural network than merely using the first data gathered for (a) products that were co-viewed with another product and the product brands of both products, and (b) products that are co-bought with another product and the product brands of both products. Examples of methods to extract word embedding are: Word2Vec, Principal Component Analysis (PCA), or Latent Dirichlet Allocation (LDA). In many embodiments, the features in the user feature system 510 (FIG. 5) can be features (e.g. predictor variables) used in the neural network. In some embodiments, when the level of probability exceeds a pre-determined threshold for a pre-determined period of time, it can be determined that the user (e.g., shopper or buyer) likely has an affinity for a certain similar brand or similar brands, wherein block 435 recommends at least early notifications of products sold by the similar brand or similar brands, price discounts for products sold within the brands, reminders, and/or other sales communications for the brand. In many embodiments, when the level of probability is below a pre-determined threshold for a pre-determined period of time, it can be determined that the shopper likely does not possess an affinity for a similar brand or similar brands of a product, wherein block 435 recommends other items or price discounts for the other items that correspond to the profile data stored in product information and storage system 310 (FIG. 3) (which can be a database of the retailer) in user profiles 532 (FIG. 5).

In several embodiments, training a recurrent neural network model of the model three neural network in block 425 can create a trained model based at least on the first data wherein the system can analyze whether the first user has affinities for a similar product brand and/or a similar product brand category. The model three neural network can comprise a cosine similarity model to identify top K brands for which the first user has an affinity out of all brands, where the top K brands can be controlled through thresholds determined by the first user, as expressed:

$$\text{similarity}(\overrightarrow{w_{m1}}, \overrightarrow{w_{m2}}) = \frac{\sum_i w_{m1,i} \cdot w_{m,2i}}{\|\overrightarrow{w_{m1}}\| \, \|\overrightarrow{w_{m2}}\|} \quad (3)$$

where i is an item, w is a word, m1 and m2 represent any two brands, $\overrightarrow{w_{m1}}$ and $\overrightarrow{w_{m2}}$ are vector representations of the brands, m1 and m2, respectively; $w_{m1,i}$ and $w_{m2,i}$ represent i-th dimension of the vectors $\overrightarrow{w_{m1}}$ and $\overrightarrow{w_{m2}}$, respectively; and $\|\overrightarrow{w_{m1}}\|$ and $\|\overrightarrow{w_{m2}}\|$ are normalizations of the vectors $\overrightarrow{w_{m1}}$ and $\overrightarrow{w_{m2}}$', respectively, wherein two product vectors are multiplied together to derive similarity between the two brands, m1 and m2. In some embodiments, block 425 can infer that users (e.g., shoppers, buyers) that prefer a product in m1 likely also prefer a similar product in m2. Block 425 is merely exemplary and is not limited to the embodiments presented herein. Block 425 can be employed in many different embodiments or examples not specifically depicted or described herein. In some embodiments, the procedures, the processes, and/or the activities of block 425 can be performed in the order presented. In other embodiments, the procedures, the processes, and/or the activities of block 425 can be performed in any suitable order. In still other embodiments, one or more of the procedures, the processes, and/or the activities of block 425 can be combined or skipped.

In many embodiments, block 425 can involve generating encoded representation vectors in binary model training system 512 (FIG. 5) and neural network model training system 513 (FIG. 5), which can be used in block 425 to train the recurrent neural network model. In some embodiments, the neural network model can be used to identify the top K brands for which users (e.g., shoppers, buyers) can exhibit strong affinity for one brand from among all possible brands, where K can be controlled through thresholds determined by the business and product requirements for user applications. In several embodiments, block 425 can include binary model training system 512 (FIG. 5) and neural network model training system 513 (FIG. 5) that can be used for selecting the first products from among a predetermined quantity of top-selling K brands on a website or webpage. In many embodiments, the top-selling K brands can be ranked in order of the top selling products, and top-selling products can be selected as the first products. In many embodiments, the pre-determined quantity of top-selling products can be approximately one hundred thousand products, one million products, ten million products, or another suitable quantity of products to provide a sufficient corpus of training data. In many embodiments, the techniques described herein can be used continuously at a scale that cannot be handled using manual techniques.

In some embodiments, method 400 can include a block 430 for determining whether to display recommendations and/or promotions for product brands or product brand categories to a first user. In many embodiments, block 430 can analyze shopping histories of the first users (e.g., shoppers, buyers) and the second users (e.g., shoppers, buyers). In some embodiments, the shopping histories can include online shopping histories and/or physical store (e.g., brick and mortar) shopping histories. In several embodiments, some websites (e.g., retailers) can register and/or store various user profiles based on the purchasing behaviors or purchasing histories of users (e.g., shoppers, buyers) with one or more retailers. In various embodiments, some user profiles can include additional user information such as whether the user has children, the gender or age of the children, the age or gender of the user, hobbies, pets, and many other ways that can describe users (e.g., shoppers, buyers). In many embodiments, some users (e.g., shoppers, buyers) can act differently depending on the persona that they take. As an example, some users may purchase expensive products when buying pet related brand products, but purchase less expensive brand products when they take on a different home persona.

In some embodiments, method 400 can include block 435 for determining whether to display recommendations and promotions for the similar product brand or the similar product brand category to a first user that can be based on the output from the model three neural network to determine whether the first user has an affinity for similar brands or brand categories.

In a number of embodiments, method 400 can include a block 440 that can transmit machine readable instructions to display the recommendations and the promotions for the first product brand, the first product brand category, the similar product brand, or the similar product brand category to the first user. In many embodiments, block 440 can analyze shopping patterns of the first users (e.g., shoppers, buyers) and the second users (e.g., shoppers, buyers). In some embodiments, the shopping patterns can include online shopping patterns, online browsing activity, and/or physical store (e.g., brick and mortar) shopping patterns.

The terms shopper and buyer are exemplary and used interchangeably to refer to any user of the system that conducts activities such as purchasing items, browsing for items, searching for items, requesting queries for items and/or other engagement activity related to shopping in general. The terms shopper or buyer can be used, in the singular or plural, are merely exemplary.

FIG. 5 illustrates a block diagram of a portion of system 300 comprising product information and storage system 310, web server 320, display system 360, and product information classification system 370, according to the embodiment shown in FIG. 3. Each of product information and storage system 310, web server 320, display system 360, and/or product information classification system 370 is merely exemplary and not limited to the embodiments presented herein. Each of product information and storage system 310, web server 320, display system 360, and/or product information classification system 370 can be employed in many different embodiments or examples not specifically depicted or described herein. In some embodiments, certain elements or modules of product information and storage system 310, web server 320, display system 360, and/or product information classification system 370 can perform various procedures, processes, and/or acts. In other embodiments, the procedures, processes, and/or acts can be performed by other suitable elements or modules. In many embodiments, the systems of product information and storage system 310, web server 320, display system 360, and/or product information classification system 370 can be modules of computing instructions (e.g., software modules) stored at non-transitory computer readable media. In other embodiments, the systems of product information and storage system 310, web server 320, display system 360, and/or product information classification system 370 can be implemented in hardware.

In many embodiments, modules within product information and storage system 310, web server 320, display system 360, and/or product information classification system 370 can store computing instructions configured to run on one or more processing modules and perform one or more acts of methods 400 (FIG. 4) (e.g., binary model training system 512 for analyzing physical store (e.g., brick and mortar) shopping histories of first users (e.g., shoppers, buyers) and second users (e.g., shoppers, buyers) in block 410 (FIG. 4); neural network model training 513 for analyzing website shopping histories of the first users (e.g., shoppers, buyers) and the second users (e.g., shoppers, buyers) in block 425 (FIG. 4); user interface system 540 for transmitting machine readable instructions to display the first recommendations and promotions for the first product for viewing by the first user in block 440 (FIG. 4); product information database 531 for retrieving product information from a website database to identify the first product with a brand in blocks 415, 420, 425 (FIG. 4); and product recommendation system 511 for determining whether to display first recommendations to the first user in block 430 (FIG. 4)).

In many embodiments, product and information storage system 310 can include a product information database 531 and user profiles 532. In certain embodiments system 531 can at least partially perform block 410 (FIG. 4) of retrieving first data from online purchase histories and online browser histories. In certain embodiments, system 532 can at least partially perform block 405 (FIG. 4) of determining brand affinities for a product brand or a product brand category.

In some embodiments, web server 320 can include online activity logging system 521, user feature history 522, and memory storage 523. In certain embodiments, online activity logging system 521 can at least partially perform block 410 (FIG. 4) of retrieving first data from online purchase histories and online browser histories corresponding to the product brand and the product brand category. In certain embodiments, user feature history 522 can at least partially perform blocks 410, 415, 420, 425 (FIG. 4) of retrieving first data from online purchase histories and online browser histories corresponding to the product brand and the product brand category, training logistic regression models, and training a neural network.

In a number of embodiments, display system 360 can include display processor system 540. In some embodiments, display processor system 540 can at least partially perform block 440 (FIG. 4) of transmitting machine readable instructions to display to display the recommendations and the promotions for the first product brand, the first product brand category, the similar product brand, or the similar product brand category to the first user.

In a number of embodiments, product information classification system 370 also can include user feature system 510, recommendation system 511, binary model training system 512, and neural network model training system 513. In certain embodiments, user feature system 510 can at least partially perform block 405 (FIG. 4) of determining brand affinities for a product brand or a product brand category. In certain embodiments, recommendation system 511, binary model training system 512, and neural network model training system 513 also can at least partially perform blocks 430, 435 (FIG. 4) of determining whether to display recommendations or promotions for product brands or the first product brand categories to a first user and/or determining whether to display recommendations and promotions for the similar product brand or the similar product brand category to a first user based on the output from the model three neural network. In certain embodiments, binary model training system 512 can at least partially perform blocks 415, 420 (FIG. 4) of training logistic regression models to derive to determine affinities for one or more product brands and/or one or more product brand categories using first data and/or output from model three. In certain embodiments, neural network model training system 513 can at least partially perform block 425 (FIG. 4) of training a neural network model to determine affinities for a similar product brand or a similar product brand category using first data.

Turning ahead to the drawing, FIG. 6, illustrates a flow chart design for the methods and systems for determining three independent models to be used to determine brand affinities for a product brand, a product category, and/or similar brands and/or brand categories that all use one form or another of first data as data inputs. In some embodiments, the methods and systems in FIG. 6 track and utilize the data from users (e.g., shoppers, buyers) engaging in multiple online activities or features (blocks 610, 620). Model one and model two, as described above, can include multiple activities, transactions, or features from physical stores (e.g., brick and mortar) (blocks 630, 640). For example, the methods and systems described can use a filtering method to de-noise the data that can be used as input features for the models in that personalization captures relevant user activities and features related to brands and brand categories. Further, the methods and systems can describe brand affinity (model one) that measures affinity of a user to a given brand as performed by the system in FIG. 3 and blocks 415 and 512 in FIGS. 4 and 5, respectively. Further, the methods and systems can describe brand category affinity (model two) that measures affinity of a user to a given brand for a given category as performed the system in FIG. 3 and blocks 420 and 512 in FIGS. 4 and 5, respectively. Further, the methods and systems can describe brand similarity model (model three) that measures the similarity between two brands as performed by the system in FIG. 3 and blocks 425 and 513 in FIGS. 4 and 5, respectively (block 650). Further, the methods and systems can describe a personalization brand model to be stored for use to determine whether to display recommendations or promotions for product brands, product brand categories, similar products, or similar product categories as performed by the system in FIG. 3 and blocks 430, 435, and 511 in FIGS. 4 and 5, respectively (block 660). In many embodiments, the methods and systems can describe personalization uses of the brand-related models to recommend relevant content on site, to a software application, a graphical user interface, email, push notifications, and other communication methods as performed by the system in FIG. 3 and blocks 440 and 540 in FIGS. 4 and 5, respectively (block 670).

The terms shopper, buyer, and user are exemplary and used interchangeably to refer to any user of the system that conducts activities such as purchasing items, browsing for items, searching for items, requesting queries for items and/or other engagement activity related to shopping in general. The terms shopper, buyer, or user can be used, in the singular or plural, are merely exemplary.

In many embodiments, the principles described herein can be rooted in computer technologies that can overcome existing problems in known database systems, specifically problems dealing with challenges associated with increasing available bandwidth, reducing network traffic, and efficiently managing databases. In some embodiments, some known database systems cannot handle massive amounts of network traffic or database requests, while keeping latency to an acceptable level and/or avoiding server crashes. In several embodiments, the principles described in this disclosure can provide a technical solution (e.g., one that utilizes databases in novel ways) for overcoming such problems. In a number of embodiments, these technology-based solutions can mark an improvement over existing computing capabilities and functionalities related to database systems by improving bandwidth, reducing network traffic and permitting greater database efficiency (e.g., by processing combined read/delete requests). In many embodiments, some novel systems can be designed to improve the way databases store, retrieve, delete and transmit data, such as, by determining whether a user has an affinity for a brand and/or a product brand.

In many embodiments, the techniques described herein can provide several technological improvements. Specifically, the techniques described herein can provide for reducing network load by enabling users (e.g., shoppers, buyers) to find relevant information faster based on known affinities for brands and/or product brands. In some embodiments, by reducing the network load, the system and method described herein can help to improve CPU, memory and cache performance for underlying recommendation systems. In several embodiments, this improvement can directly reduce the number of service calls per second received in network traffic and the improvement in processing speed can translate into better usage of various system components like CPU, memory, hard disk, etc. In several embodiments, as noted above, methods and systems can be capable of processing huge store purchase data efficiently and can allow recommendation systems to isolate or filter users (e.g., shoppers, buyers) by determining which users can be determined to have affinities for brands, brand categories, similar brands, or similar brand categories based on these models using smaller memory footprint, as described in greater detail above.

One advantage of the techniques and/or approaches described above is that once users can be identified as having affinities for brands, brand categories, similar brands, or similar brand categories are identified, those specific users (e.g., shoppers, buyers) can be presented primarily with relevant products that have great value as opposed to a general pool of items, hence reducing the number of pages that users would need to browse on a website in order to reach the items that are of specific interest (e.g., purchasing) to those specific users. In some embodiments, this approach can be different from previous approaches, which previous approaches applied subjective human manual determinations to determine, and/or did not involve manually annotating users (e.g., shoppers, buyers), who among the users of the websites could have affinities for brands, brand categories, similar brands, or similar brand categories. In several embodiments, identifying users that likely have affinities for brands, brand categories, similar brands, or similar brand categories does not exist in some other conventional approaches. In many embodiments, because this method covers the identification of users (e.g., shoppers, buyers) itself, any approach of identifying item recommendations can be used. This level of personalization for transmitting recommendations and promotions does not exist in conventional approaches to targeted emails to particular groups. Moreover, this level of personalization in the timing of when the user is sent the email does not exist in conventional approaches, which typically transmit recommendations and promotions to each user at a present time after a certain action, or to all of a group of users at the same time after a certain event (e.g., after a price discount, or promotions for new merchandise affiliated with a brand and/or brand categories).

Additionally, the techniques described herein can run continuously based on new information and data continually being received from actions (e.g., activities, user behavior) of users (e.g., 350-351 (FIG. 3)) on the website hosted by web server 320 (FIG. 3) and based on the responses to the users (e.g., 350-351 (FIG. 3)) to the e-mails that continue to get sent out. In many embodiments, running these techniques continually (e.g., hourly, daily, etc.) can provide real-time determinations of which e-mail and at what time to send the e-mail to a particular user, based on the current activity (e.g., within the last hour, day, etc.) of the user on the website and based on the activity of other users on the website and responses of other users to the emails within the last hour, day, etc.

In many embodiments, the techniques described herein can be used regularly (e.g., hourly, daily, etc.) at a scale that cannot be handled using manual techniques. For example, the number of monthly visits to the website can exceed approximately one hundred million, and the number of registered users to the website can exceed approximately ten million.

The techniques described herein solve a technical problem that cannot be solved using more traditional forms of advertising such as direct mail via the United States Postal Service. In fact, the techniques described herein cannot be applied to such traditional forms of advertising because the logistic regression model cannot be trained in view of a lack of data. For example, it would not be possible to know whether a recipient of the direct mail reviewed the direct mail and, in response to reviewing the direct mail, typed the web address on the direct mail into the recipient's web browser to view a web page, or whether the recipient happened to view that web page due to another referral source.

In many embodiments, the techniques described herein can provide several technological improvements. Specifically, the techniques described herein can provide for improved techniques that can better provide products that may be of interest to users (e.g., shoppers, buyers). In some embodiments, typical users can be interested in different brands or products with varying intensity. In several embodiments, users can be interested in products that can be sold by, or manufactured by, a given brand. This technique can improve upon conventional (e.g., existing techniques) product recommender systems. In some embodiments, by identifying brands of interest for users, these systems can provide recommendations using heavier weights on certain brands of interest of the user thereby, improving certain marketing automation techniques. In a number of embodiments, by identifying brands of interest to these users, some marketers can send product advertisements and/or messages that can best capture the varying (e.g., evolving) interests of users to enhance the quality of recommendation content to the specific user. In some embodiments, by maintaining a distribution pertaining to a high confidence of accuracy using the scores obtained for users with an affinity for brands and/or product brands, the method and/or systems can leverage the information to transmit communications for brands and/or product brands using maximal precision that can reduce wasting computer resources.

In many embodiments, some conventional approaches that can be used by other recommender systems and/or other networks do not take into account users who have affinities towards particular brands which can lead to additional inefficiencies in using computer resources when deriving relevant product recommendations displayed and/or transmitted to users, as described in greater detail above. In several embodiments, given a pool of products from a set of particular brands that can be of interest to users, by sending the recommendations to the subset of customers who can be interested in the set of particular brands can reduce the amount of computer resources often used to calculate the same calculation for those users who are not interested in the recommendations. In some embodiments, by reducing the computer resources used for calculations based on all categories (e.g., classes) of users regardless of an affinity for brands or product brands, the methods and/or systems can improve upon conventional approaches by reducing overall network usage. As an example, suppose a given user has affinity towards ten different brands in the given category, wherein computing resources to run recommendation calculations would no longer be required for those brands in which users have shown no affinity towards those brands or product brands, thereby reducing the computing requirements significantly.

In various embodiments, as previously described above, conventional approaches used by web server systems and/or networks do not take into account users that have an affinity for certain brands and/or product brands that can lead to the inefficient use of computer resources for storing relevant raw data. In some embodiments, specifically using a conventional recommender system, huge amounts of raw data can be used to predict products that can be of interest to users without identifying certain brands in the data. In several embodiments, by identifying brands of interest to the user, the huge amount of raw data can be consolidated when used in any of the learning models and also can lead to using less hard disk space to store the smaller (e.g., lesser) amounts of user data, as discussed in greater detail above.

Various embodiments can include a system for determining the brand affinity of users including one or more processors and one or more non-transitory computer-readable media storing computing instructions configured to run on the one or more processors and perform certain acts. The acts can include determining a first user who has brand affinities about a first product brand or a first product brand category. The acts also can include retrieving online purchase histories and online browser histories of the first user from one or more databases. The one or more databases can correspond to the first product brand and the first product brand category. The acts can include analyzing whether the first user has brand affinities for the first product brand or the first brand category with two binary classification models. The two binary classification models can include (a) a model one to determine an affinity to a particular first product brand and (b) a model two to determine an affinity to a particular first product brand category. The acts also can include analyzing whether the first user has affinities for a similar product brand or a similar product brand category by a model three neural network. A model three neural network can include determining an affinity for the similar product brand or the similar product brand category. The acts can include determining whether to display recommendations or promotions for the first product brand or the first product brand category to the first user based on results from the model one or the model two binary classification models. The acts also can include determining whether to display recommendations and promotions for the similar product brand or the similar product brand category to the first user based on output from the model three neural network. The acts can include preparing machine readable instructions to display the recommendations and the promotions for the first product brand, the first product brand category, the similar product brand, or the similar product brand category to the first user. The acts can additionally include transmitting machine readable instructions to display the recommendations and the promotions for the first product brand, the first product brand category, the similar product brand, or the similar product brand category to the first user.

A number of embodiments can include a method being implemented via execution of computing instructions configured to run at one or more processors and stored at one or more non-transitory computer-readable media. The method can include determining a first user who has brand affinities about a first product brand or a first product brand category. The method also can include retrieving online purchase histories and online browser histories of the first user from one or more databases. The one or more databases can correspond to the first product brand and the first product brand category. The method can include analyzing whether the first user has brand affinities for the first product brand or the first brand category with two binary classification models. The two binary classification models can include (a) a model one to determine an affinity to a particular first product brand and (b) a model two to determine an affinity to a particular first product brand category. The method also can include analyzing whether the first user has affinities for a similar product brand or a similar product brand category by a model three neural network. A model three neural network can include determining an affinity for the similar product brand or the similar product brand category. The method can include determining whether to display recommendations or promotions for the first product brand or the first product brand category to the first user based on results from the model one or the model two binary classification models. The method also can include determining whether to display recommendations and promotions for the similar product brand or the similar product brand category to the first user based on output from the model three neural network. The method can include preparing machine readable instructions to display the recommendations and the promotions for the first product brand, the first product brand category, the similar product brand, or the similar product brand category to the first user. The method can additionally include transmitting machine readable instructions to display the recommendations and the promotions for the first product brand, the first product brand category, the similar product brand, or the similar product brand category to the first user.

Although systems and methods for identifying users (e.g., shoppers, buyers) determined to likely have affinities for brands, brand categories, similar brands, or similar brand categories have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 3, 4, and 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  determining a first user who has brand affinities about a first product brand or a first product brand category by:
    retrieve online purchase histories and online browser histories of the first user from one or more databases corresponding to the first product brand and the first product brand category;
    analyze whether the first user has brand affinities for the first product brand or the first product brand category by using two binary classification models:
      (a) a model one to determine an affinity to a particular first product brand when a first output of the model one exceeds a first predetermined threshold value for a product brand within a predetermined period of time, wherein the first output is a first probability score; and
      (b) a model two to determine an affinity to a particular first product brand category when a second output of the model two exceeds a second predetermined threshold value for a product brand category within the predetermined period of time, wherein the second output is a second probability score; and
    analyze whether the first user has affinities for a similar product brand or a similar product brand category by a model three neural network to determine an affinity for the similar product brand or the similar product brand category, wherein the similar product brand is similar to the first product brand, and wherein the similar product brand category is similar to the first product brand category;

determining whether to display recommendations and promotions for the first product brand or the first product brand category to the first user based on results from the two binary classification models;

determining whether to display recommendations and promotions for the similar product brand or the similar product brand category to the first user based on output from the model three neural network;

preparing machine readable instructions to display the recommendations and the promotions for the first product brand, the first product brand category, the similar product brand, or the similar product brand category to the first user; and transmitting the machine readable instructions to display the recommendations and the promotions for the first product brand, the first product brand category, the similar product brand, or the similar product brand category to the first user.

2. The system of claim 1, wherein the online purchase histories comprise purchase transactions, and wherein the online browser histories comprise histories of web browsing and histories of viewing brand specific webpages.

3. The system of claim 1, wherein the model one to determine the affinity to the particular first product brand further comprises the first user represented as:

Affinity for Brand $M = P(\text{Brand} = M \mid \text{User Features for Brand} = M) =$
$$P(B = M \mid F_{M1}, F_{M2} F_{M3}, \ldots)$$

wherein, P is for probability, B is a brand, M is a particular brand, F is a feature of the first user and $F_{M1}$, $F_{M2}$, $F_{M3}$, ... are features related to a user for whom brand affinity is being computed.

4. The system of claim 1, wherein the model two to determine the affinity to the particular first product brand category further comprises a binary classification model similar to the model one except that positive labels for the binary classification model uses only affinity to a brand for a given brand category while treating other brands as negative labels, wherein the first user can be represented as:

Affinity for Brand $M(\text{Category } A) = P(\text{Brand}=M,$
$\text{Category}=A \mid \text{User Features for Brand}=M)=P$
$(B=M,\text{Category}=A \mid F_{M1},F_{M2}F_{M3}, \ldots)$ wherein A is a brand category comprising a category or a SKU; B is a brand, M is a particular brand, F is a feature of the first user and $F_{M1}$, $F_{M2}$, $F_{M3}$, ... are features related to a user for whom brand category affinity is being computed.

5. The system of claim 1, wherein analyze whether the first user has brand affinities for the first product brand or the first product brand category by using the two binary classification models further comprises:

a given vector of features for the first user to classify whether the first user has an affinity for a given brand;
training the two binary classification models using the given vector of features associated with one or more activities of the first user as input; and
running multiple regression models trained to derive affinity to the given brand in a given product brand category.

6. The system of claim 1, wherein analyze whether the first user has the affinities for the similar product brand or the similar product brand category by the model three neural network further comprises a cosine similarity model to identify top K brands for which the first user has an affinity out of all brands, where the top K brands can be controlled through thresholds determined by the first user, as expressed:

$$\text{similarity}(\vec{w_{m1}}, \vec{w_{m2}}) = \frac{\sum_i w_{m1,i} \cdot w_{m,2i}}{\|\vec{w_{m1}}\| \; \|\vec{w_{m2}}\|}$$

where i is an item, w is for a word, m1 and m2 represent any two brands, $\vec{w}_{m1}$ and $\vec{w}_{m2}$ are vector representations of the brands, m1 and m2, respectively; $w_{m1,i}$ and $w_{m2,i}$ represent i-th dimension of vectors $\vec{w}_{m1}$ and $\vec{w}_{m2}$, respectively; and $\|\vec{w}_{m1}\|$ and $\|\vec{w}_{m2}\|$ are normalizations of the vectors $\vec{w}_{m1}$ and $\vec{w}_{m2}$', respectively, wherein two product vectors are multiplied together to derive similarity between the two brands, m1 and m2.

7. The system of claim 1, wherein the model three neural network further comprises:

identification of similar brands by a neural network model with item attributes and first user features comprising co-bought, co-clicked, and co-viewed brands to obtain latent vector representation of product brands;

extracting the product brands from the online purchase histories or the online browser histories of the first user, wherein the product brands are treated as words in a sentence as part of the neural network model; and generating word embedding from the sentence to infer latent features to find product similarities.

8. The system of claim 1, wherein the model three neural network to determine an affinity for the similar product brand or the similar product brand category further comprises affinities of the first user for one or more similar product brands or one or more similar product brand categories in a given product category corresponding to a first product in one or more first product categories.

9. The system of claim 1, wherein the recommendations and the promotions for the first product brand, the first product brand category, the similar product brand, or the similar product brand category further comprise at least one of new product recommendations, new merchandise alerts, merchandise updates, stock inventory, sales, or discounts.

10. The system of claim 1, wherein transmitting the machine readable instructions to display the recommendations and the promotions further comprises transmitting the machine readable instructions to display the recommendations and the promotions on a website, an app, an email, or a push notification.

11. A method comprising:

determining a first user who has brand affinities about a first product brand or a first product brand category by:
retrieving online purchase histories and online browser histories of the first user from one or more databases corresponding to the first product brand and the first product brand category;

analyzing whether the first user has brand affinities for the first product brand or the first product brand category by using two binary classification models:
(a) a model one to determine an affinity to a particular first product brand when a first output of the model one exceeds a first predetermined threshold value for a product brand within a predetermined period of time, wherein the first output is a first probability score; and
(b) a model two to determine an affinity to a particular first product brand category when a second output of the model two exceeds a second predetermined threshold value for a product brand category within the predetermined period of time, wherein the second output is a second probability score; and
analyzing whether the first user has affinities for a similar product brand or a similar product brand category by a model three binary classification algorithm to determine an affinity for the similar product brand or the similar product brand category, wherein the similar product brand is similar to the first product brand, and wherein the similar product brand category is similar to the first product brand category;
determining whether to display recommendations and promotions for the first product brand or the first product brand category to the first user based on results from the model one or the model two binary classification models;
determining whether to display recommendations and promotions for the similar product brand or the similar product brand category to the first user based on results from the model three binary classification algorithm;
preparing machine readable instructions to display the recommendations and the promotions for the first product brand, the first product brand category, the similar product brand, or the similar product brand category to the first user; and
transmitting the machine readable instructions to display the recommendations and the promotions for the first product brand, the first product brand category, the similar product brand, or the similar product brand category to the first user.

12. The system of claim 11, wherein the online purchase histories comprise purchase transactions, and wherein the online browser histories comprise histories of web browsing and histories of viewing brand specific webpages.

13. The system of claim 11, wherein the model one to determine the affinity to the particular first product brand further comprises the first user represented as:

$$\text{Affinity for Brand } M = P(\text{Brand} = M \mid \text{User Features for Brand} = M) = P(B = M \mid F_{M1}, F_{M2} F_{M3}, \dots)$$

wherein, P is for probability, B is a brand, M is a particular brand, F is a feature of the first user and $F_{M1}$, $F_{M2}$, $F_{M3}$, ... are features related to a user for whom brand affinity is being computed.

14. The system of claim 11, wherein the model two to determine the affinity to the particular first product brand category further comprises a binary classification model similar to the model one except that positive labels for the binary classification model uses only affinity to a brand for a given brand category while treating other brands as negative labels, wherein the first user can be represented as:

$$\text{Affinity for Brand } M(\text{Category } A) = P(\text{Brand}=M, \text{Category}=A \mid \text{User Features for Brand}=M) = P(B=M, \text{Category}=A \mid F_{M1}, F_{M2} F_{M3}, \dots)$$

wherein, P is for probability, B is a brand, M is a particular brand, F is a feature of the first user and $F_{M1}$, $F_{M2}$, $F_{M3}$, ... are features related to a user for whom the brand category affinity is being computed.

15. The system of claim 11, wherein analyzing whether the first user has brand affinities for the first product brand or the first product brand category by using the two binary classification models further comprises:
a given vector of features for the first user to classify whether the first user has an affinity for a given brand;
training the two binary classification models using the given vector of features associated with one or more activities of the first user as input; and
running multiple regression models trained to derive affinity to the given brand in a given product brand category.

16. The system of claim 11, wherein analyze whether the first user has the affinities for the similar product brand or the similar product brand category by the model three neural network further comprises a cosine similarity model to identify top K brands for which the first user has an affinity out of all brands, where the top K brands can be controlled through thresholds determined by the first user, as expressed:

$$\text{similarity}(\vec{w_{m1}}, \vec{w_{m2}}) = \frac{\sum_i w_{m1,i} \cdot w_{m,2i}}{\|\vec{w_{m1}}\| \, \|\vec{w_{m2}}\|}$$

where i is an item, w is for a word, m1 and m2 represent any two brands, $\vec{w_{m1}}$ and $\vec{w_{m2}}$ are vector representations of the brands, m1 and m2, respectively; $w_{m1,i}$ and $w_{m2,i}$ represent i-th dimension of vectors $\vec{w_{m1}}$ and $\vec{w_{m2}}$, respectively; and $\|\vec{w_{m1}}\|$ and $\|\vec{w_{m2}}\|$ are normalizations of the vectors $\vec{w_{m1}}$ and $\vec{w_{m2}}$', respectively, wherein two product vectors are multiplied together to derive similarity between the two brands, m1 and m2.

17. The system of claim 11, wherein a model three neural network further comprises:
identification of similar brands by a neural network model with item attributes and first user features comprising co-bought, co-clicked, and co-viewed brands to obtain latent vector representation of product brands;
extracting the product brands from the online purchase histories or the online browser histories of the first user, wherein the product brands are treated as words in a sentence as part of the neural network model; and
generating word embedding from the sentence to infer latent features to find product similarities.

18. The system of claim 11, wherein a model three neural network to determine an affinity for the similar product brand or the similar product brand category further comprises affinities of the first user for one or more similar product brands or one or more similar product brand categories in a given product category corresponding to a first product in one or more first product categories.

19. The system of claim 11, wherein the recommendations and the promotions for the first product brand, the first product brand category, the similar product brand, or the similar product brand category further comprise at least one of new product recommendations, new merchandise alerts, merchandise updates, stock inventory, sales, or discounts.

20. The system of claim 11, wherein transmitting the machine readable instructions to display the recommendations and the promotions further comprises transmitting the machine readable instructions to display the recommendation and the promotions on a website, an app, an email, or a push notification.

* * * * *